United States Patent
Schlecht et al.

[15] 3,671,584
[45] June 20, 1972

[54] PROCESS FOR THE CONTINUOUS PRODUCTION OF α-CHLOROPROPIONIC ACID

[72] Inventors: Helmut Schlecht, Ludwigshafen; Robert Aurnhammer, Limburgerhof, both of Germany

[73] Assignee: Badische Anilin- & Soda-Fabrik Aktiengesellschaft, Ludwigshafen/Rhein, Germany

[22] Filed: May 20, 1969

[21] Appl. No.: 826,267

[30] Foreign Application Priority Data

May 24, 1968 Germany..................P 17 68 536.8

[52] U.S. Cl.......................................260/539 R, 260/539 A
[51] Int. Cl...........................................................C07c 53/32
[58] Field of Search............................260/539, 539 A, 539 R

[56] References Cited

UNITED STATES PATENTS 2,010,685  8/1935  Bass........................................260/539

Primary Examiner—Lorraine A. Weinberger
Assistant Examiner—John F. Terapane
Attorney—Johnston, Root, O'Keeffe, Keil, Thompson & Shurtleff

[57] ABSTRACT

An improved process for the continuous production of α-chloropropionic acid by reaction of propionic acid with chlorine in the presence of halides or acid halides of the elements phosphorus and sulfur at elevated temperature, the improvement consisting in carrying out the reaction in the presence of α-chloropropionic acid as solvent and distilling the resultant reaction mixture using the gas formed in the reaction as carrier gas. α-chloropropionic acid is used for the production of plant protection agents.

6 Claims, No Drawings

PROCESS FOR THE CONTINUOUS PRODUCTION OF α-CHLOROPROPIONIC ACID

This invention relates to an improved process for the continuous production of α-chloropropionic acid by reaction of propionic acid with chlorine in the presence of halides or acid halides of the elements phosphorus or sulfur.

It is known from U.S. Pat. No. 2,010,685 that α-chloropropionic acid can be advantageously obtained by reaction of propionic acid with chlorine in the presence of halides or acid halides of the elements sulfur or phosphorus. Formation of β-chloropropionic acid is prevented by use of a catalyst, but the process has the disadvantage α,α-dichloropropionic acid is formed to a certain extent. This disadvantage occurs particularly in the continuous production of α-chloropropionic acid. The α,α-dichloropropionic acid formed can only be separated from α-chloropropionic acid with very elaborate equipment. Another disadvantage is that the α-chloropropionic acid is discolored to a very marked extent during the separation of unreacted propionic acid by distillation.

We have now found that the production of α-chloropropionic acid by reaction of propionic acid with chlorine in the presence of halides or acid halides of the elements phosphorus or sulfur at elevated temperature can be carried out continuously more advantageously than hitherto by effecting the reaction in the presence of α-chloropropionic acid as solvent and distilling the resultant reaction mixture using the gas formed in the reaction as carrier gas.

The new process has the advantage that less α,α-dichloropropionic acid than hitherto is formed and further that the α-chloropropionic acid does not discolor during distillation.

Propionic acid and chlorine are preferably used in stoichiometric amounts. It is advantageous to use such an amount of chlorine that the reaction gas formed is free from molecular chlorine.

The reaction is carried out in the presence of α-chloropropionic acid as solvent. It has proved to be advantageous to use such an amount of chloropropionic acid that from 5 to 15 percent, particularly from 5 to 10 percent, by weight of propionic acid is contained in the reaction mixture. These limits can easily be maintained by regulating the amount of propionic acid flowing in during the chlorination.

The reaction is carried out in the presence of halides or acid halides of the elements phosphorus or sulfur. Examples of suitable halides and acid halides of the said elements are phosphorus trichloride, phosphorus tribromide, sulfonyl chloride and sulfur dichloride. It is especially preferred to use the chlorides or acid chlorides of the said elements. The reaction is particularly successful when phosphorus trichloride is used as the catalyst. The catalyst is advantageously used in an amount of from 1 to 6 percent, particularly from 2 to 4 percent, by weight with reference to the propionic acid.

The reaction is advantageously carried out at a temperature of from 120° to 180° C. Reaction temperatures of from 140° to 160° C. have proved to be particularly favorable.

It is of advantage to carry out the reaction so that a mean residence time of the propionic acid to be chlorinated in the chlorination zone of from 1 to 10 hours, particularly from 2 to 4 hours, is maintained.

The reaction mixture leaving the chlorination zone is continuously distilled in a column, the gas formed in the chlorination being used as carrier gas. It is advantageous to use columns having from five to 30 theoretical trays. It is advantageous in the distillation to introduce the reaction mixture at the middle of the column, for example at the 15th theoretical tray, and to pass the chlorination off-gas through the column bottoms and to withdraw it overhead. It is advantageous to maintain in the column bottoms a temperature of from 120° to 180° C, particularly from 140° to 170° C. and at the top of the column a temperature of from 100° to 140° C. Unreacted propionic acid is withdrawn at the top of the column and may be returned to the reaction mixture. The α-chloropropionic acid is withdrawn continuously from the bottoms of the column.

The process according to this invention may be carried out by continuously supplying propionic acid and chlorine in the specified ration to a stirred vessel which is charged with chloropropionic acid, care being taken to ensure that the content of propionic acid, the temperature and the said residence time are maintained. It has proved to be particularly advantageous in industry to carry out the reaction in recycle apparatus into which propionic acid, catalyst and chlorine are introduced at different points and the reaction gas formed is withdrawn at the top and the reaction mixture is withdrawn through a siphon at the same rate as the substances are supplied. The reaction mixture obtained is supplied, as described above, to a distillation column and distilled under the specified conditions in the presence of the gas formed in the reaction as carrier gas.

The α-chloropropionic acid prepared by the process according to this invention is suitable for the production of plant protection agents.

The invention is illustrated by the following example.

EXAMPLE

A recycle apparatus (holding about 2 liters of reaction mixture) consisting of two vertical tubes each about 2 meters long which are connected together at the top and bottom by two short lengths of horizontal tube. One vertical tube has a diameter of 25 mm and a feed pipe for chlorine in the lower portion. The other vertical tube has a diameter of 15 mm, an overflow provided with a siphon in the upper portion for the effluent reaction mixture and at a point below the same a feed pipe for propionic acid. There is a gas outlet in the upper portion of the apparatus which leads to a condenser. The overflow pipe of the chlorination apparatus is connected to the supply pipe of a Raschig ring column having a length of about 2 meters and a diameter of 25 mm, the supply pipe being about half-way up the column. The bottoms of the column, which holds about 1 liter, can be heated externally and has an outlet provided with a siphon and an inlet pipe which is connected of the gas outlet of the chlorination apparatus. The vapors from the column are withdrawn through a condenser. The condensate formed therein during operation may be allowed to flow either into the column or into the chlorination apparatus.

The chlorination apparatus is filled with 2 liters of α-chloropropionic acid. At 150° C., 500 g of propionic acid with which 15 g of phosphorus trichloride has been mixed and 460 g of gaseous chlorine are introduced per hour at the points provided and at the same time the reaction mixture is allowed to flow out through the overflow pipe into the distillation column at such a rate that the level of liquid in the chlorination apparatus remains constant. When constant conditions have been achieved, the reaction mixture contains about 92 percent of α-chloropropionic acid, about 2 percent of α,α-dichloropropionic acid and about 6 percent of propionic acid and has a specific gravity of 1.20 (measured at 20° C.). The off-gas from the chlorination is cooled in the said condenser, and the condensate thus obtained flows back into the chlorination apparatus.

The α-chloropropionic acid collects in the bottoms of the distillation column. The acid is kept at 160° C., the off-gas coming from the chlorination apparatus continuously flowing through it, and is continuously withdrawn. The vapors leaving the column are cooled. About 200 g per hour of condensate is thus obtained of which such an amount is returned as reflux to the column that a temperature of 130° C. is set up at the top of the column. The rest of the condensate is allowed to flow back into the chlorination apparatus. 702 g per hour of a water-clear liquid having a content of 96.5 percent of α-chloropropionic acid, 0.8 percent of propionic acid and 2.5 percent of α,α-dichloropropionic acid (determined by gas chromatography) is obtained. This is equivalent to a yield of 92.3 percent of α-chloropropionic acid (calculated 100 percent) with reference to propionic acid used. The specific grawity if 1.272 (measured at 20° C.).

If nitrogen (in an amount of 150 liters per hour) is used as carrier gas instead of the chlorination off-gas in the rectification, only 608 g per hour of a brown end product is obtained having a content of 95.5 percent of α-chloropropionic acid, equivalent to a yield of 79.3 percent of α-chloropropionic acid (calculated 100 percent) with reference to propionic acid used. Resinous products are gradually deposited in the column and after some time the column becomes clogged up so that operation has to be stopped.

If 150 liters per hours of hydrogen chloride is used as carrier gas instead of the chlorination off-gas, the yield is also less. Although the end product is somewhat lighter in color than when using nitrogen, resinous substances are also deposited in the course of time in the column, resulting in clogging.

When using both nitrogen and hydrogen chloride as carrier gas, it is necessary to use about 20 g of phosphorus trichloride for each 500 g of propionic acid to be reacted, i. e. about one third more than when using the chlorination off-gas.

We claim:

1. In a process for the continuous production of α-chloropropionic acid by reaction of propionic acid with chlorine in the presence of a chloride or acid chloride of one of the elements phosphorus and sulfur at a temperature of from 120° to 180° C., the improvement which comprises carrying out the reaction in the presence of α-chloropropionic acid as solvent in an amount such that the reaction mixture contains about 5 to 15 percent by weight of propionic acid, and distilling the resultant reaction mixture using the gas formed in the reaction as carrier gas.

2. A process as claimed in claim 1 wherein propionic acid and chlorine are used in stoichiometric amounts.

3. A process as claimed in claim 1 wherein the amount of α-chloropropionic acid used is such that the reaction mixture contains from 5 to 10 percent by weight of propionic acid.

4. A process as claimed in claim 1 wherein from 1 to 6 percent by weight of a chloride or acid chloride of phosphorus or sulfur is used.

5. A process as claimed in claim 1 wherein the reaction is carried out at from 140° to 160° C.

6. A process as claimed in claim 1 wherein a mean residence time of 1 hour to 10 hours is maintained in the chlorination zone.

* * * * *

PO-1050
(5/69)

UNITED STATES PATENT OFFICE
CERTIFICATE OF CORRECTION

Patent No. 3,671,584        Dated June 20, 1972

Inventor(s) Helmut Schlecht and Robert Aurnhammer

It is certified that error appears in the above-identified patent and that said Letters Patent are hereby corrected as shown below:

Column 2, line 3, "ration" should read --ratio --; line 75, "gravity if" should read -- gravity is --.

Signed and sealed this 9th day of January 1973.

(SEAL)
Attest:

EDWARD M. FLETCHER, JR.
Attesting Officer

ROBERT GOTTSCHALK
Commissioner of Patents